(12) United States Patent
Johnson et al.

(10) Patent No.: US 8,599,394 B2
(45) Date of Patent: Dec. 3, 2013

(54) RECOVERY FROM AN OUT OF STORAGE CONDITION AT A RIP SPOOL FOR STORING RASTER DATA

(75) Inventors: Charles D. Johnson, Boulder, CO (US); David Ward, Broomfield, CO (US); Yung-Chung Su, Superior, CO (US); Lisa A. Morgan, Blackfoot, ID (US)

(73) Assignee: Ricoh Company, Ltd, Tokyo (JP)

( * ) Notice: Subject to any disclaimer, the term of this patent is extended or adjusted under 35 U.S.C. 154(b) by 247 days.

(21) Appl. No.: 13/182,899

(22) Filed: Jul. 14, 2011

(65) Prior Publication Data

US 2013/0016380 A1    Jan. 17, 2013

(51) Int. Cl.
*G06F 3/12* (2006.01)

(52) U.S. Cl.
USPC .......................... 358/1.13; 358/1.15; 358/1.16

(58) Field of Classification Search
USPC ..................... 358/1.13, 1.14, 1.15, 1.16, 1.17
See application file for complete search history.

(56) References Cited

U.S. PATENT DOCUMENTS

| | | |
|---|---|---|
| 2004/0030627 A1 | 2/2004 | Sedukhin |
| 2004/0190042 A1 | 9/2004 | Ferlitsch et al. |
| 2004/0263899 A1 | 12/2004 | Ferlitsch |
| 2005/0165656 A1 | 7/2005 | Frederick |
| 2009/0099940 A1 | 4/2009 | Frederick |
| 2009/0144172 A1 | 6/2009 | Frederick |

OTHER PUBLICATIONS

"Statement in Accordance With the Notice From the European Patent Office Dated Oct. 1, 2007 Concerning Business Methods—EPC/ Erklaerung Gemaess der Mitteilung des Europaeischen Patentampts Vom 1. Oktober 2007 Ueber Geschaeftsmethoden—EPU/ Declaration Conforement Au Communique de l'Office Europ", Nov. 1, 2007, XP007905525.

Moore et al., "A Service Broker and Business Model for SaaS Applications," Computer Systems and Applications, 2009. AICCSA 2009. IEEE/ACS International Conference on, IEEE, Piscataway, NJ, USA, May 10, 2009, pp. 322-329, XP031471305, ISBN: 978-1-4244-3807-5.

Mietzner et al: "Towards Provisioning the Cloud: On the Usage of Multi-Granularity FLows and Services to Realize a Unified Provisioning Infrastructure for SaaS Applications", Congress on Services—Part I, 2008. Services '08. IEEE, IEEE, Piscataway, NJ, USA, Jul. 6, 2008, pp. 3-10, XP03129144, ISBN: 978-0-7695-3286-8.

*Primary Examiner* — Vu B Hang
(74) *Attorney, Agent, or Firm* — Duft Bornsen & Fettig, LLP

(57) ABSTRACT

Methods and systems herein provide for recovering from an out of storage condition at a rip spool for storing raster data. In one embodiment, a print controller receives a command to print multiple copies of a print job. The print controller buffers for rasterization multiple copies of print data for the print job, and determines if a rip spool has storage space available to store a complete rasterized version of the print job. If the rip spool does not have storage space available, then the print controller performs a rasterization process on the multiple copies of the print data for the print job, and provides multiple rasterized copies of the print job to a print engine. If the rip spool has storage space available, then the print controller performs a rasterization process on one copy of the print job and discards additional buffered copies of the print data.

18 Claims, 4 Drawing Sheets

RECOVERY FROM AN OUT OF STORAGE CONDITION AT A RIP SPOOL FOR STORING RASTER DATA

FIELD OF THE INVENTION

The invention relates to the field of printing systems, and in particular, to recovering from an out of storage condition at a rip spool for storing raster data for a print job.

BACKGROUND

Printers generally include a print controller that receives raw print data (e.g., Page Description Language (PDL) data), and a print engine. The print controller rasterizes the logical pages of the print job into bitmap images. Typically, bitmap images for the print job take up a much larger amount of storage space than the original PDL data for the print job. Thus, some modern printing systems may also include one or more hard disk drives to store bitmap data. A disk (or a partition of a disk) that is used to store bitmap data may also be referred to as a rip spool.

During the printing process, print data for the job (e.g., PDL data) is rasterized and written to the rip spool. The bitmap data may then be de-spooled and sent to a print engine for imprinting to a media, such as paper. The rip spool is used as a buffer between the rasterization process and the imprinting process, because the time required to rasterize different print jobs (or different parts of the same print job) may vary due to differences in the complexity of the PDL data. Therefore, while a print engine may consume bitmap data at a nearly fixed rate based on the print speed of the printer, the rasterizer (or rasterizers) produces bitmap data at a varying rate based on the complexity of the PDL data in the print job.

When printing multiple copies of a print job, it is more efficient to rasterize the print job once and to write the complete raster data for the job to the rip spool. Raster data for the print job may then be de-spooled multiple times off of the rip spool and sent to the print engine. This improves the throughput of the printing process because it is faster to de-spool the raster data multiple times from the rip spool than it is to rasterize the print job multiple times.

A rip spool, although large in storage space, is a finite resource and therefore, may eventually run out of storage space (e.g., become full). Also, the rip spool may be too small to store a complete rasterized version of a print job. It thus remains a problem to recover from an out of storage condition at a rip spool for storing raster data for a print job.

SUMMARY

Embodiments described herein provide for recovering from an out of storage condition at a rip spool used for storing raster data for a print job. In the embodiments provided, a command is received by the print controller to print multiple copies of a print job. The print controller buffers for rasterization multiple copies of print data for the print job. If a rip spool does not have storage space available to store a complete rasterized version of the print job, then the print controller rasterizes the multiple copies of print data for the print job and provides multiple rasterized copies of the job to a print engine. If the rip spool has storage space available to store a complete rasterized version of the print job, then the print controller rasterizes one copy of job, and spools the rasterized copy of the job to the rip spool. The print controller then de-spools the rasterized copy multiple times from the rip spool to the print engine and discards copies (or partial copies) of the print job that are buffered for rasterization.

In one embodiment, a print controller includes a control system and a rasterizer. The rasterizer generates raster data for print jobs, and writes the raster data to a rip spool. The control system receives a command to print multiple copies of a print job. The control system buffers for the rasterizer multiple copies of print data for the print job, and dynamically determines if a rip spool has storage space available to store raster data for a complete rasterized version of the print job. If the rip spool becomes full, then the rasterizer performs a rasterization process on the multiple copies of print data in the buffer, and provides multiple rasterized copies of the job to a print engine. If the rip spool has storage space available to store a complete rasterized version of the job, then the rasterizer performs a rasterization process on one copy of the print job, and spools the one rasterized copy of the job to the rip spool. The control system de-spools the rasterized copy of the job multiple times from the rip spool to a print engine, and discards additional copies (or partial copies) of print data for the job that are buffered for rasterization.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
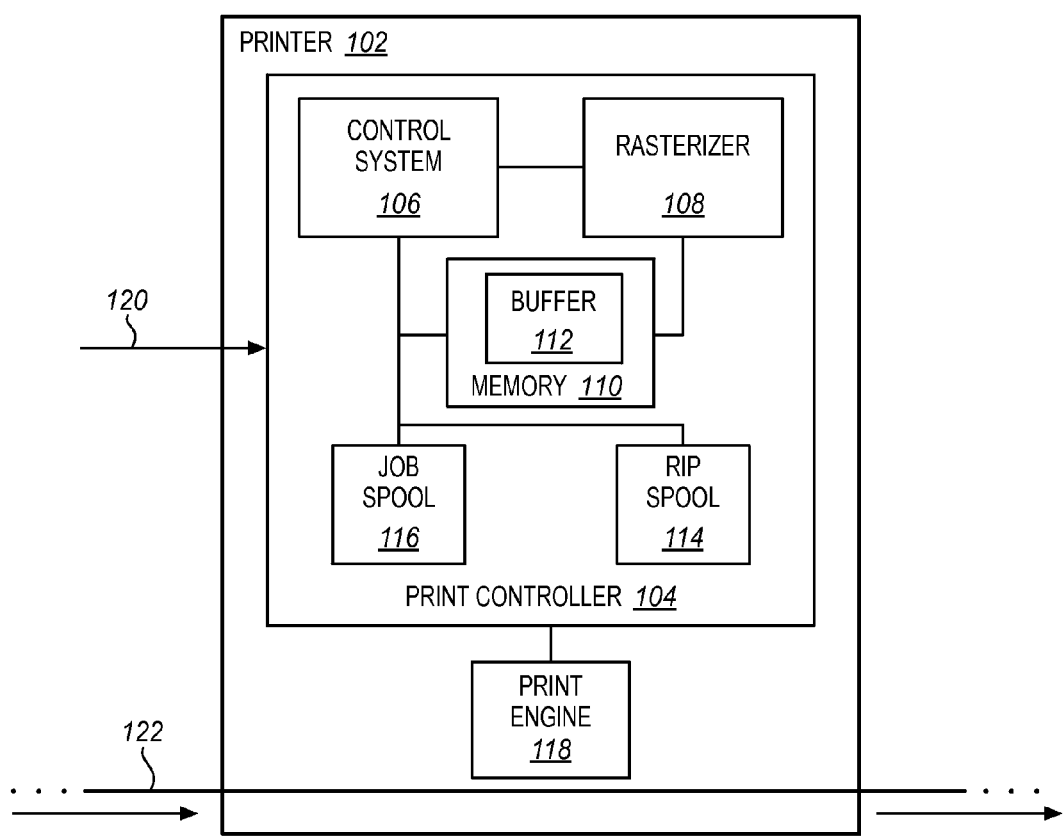
FIG. 1 is a block diagram of a printer in an exemplary embodiment.

FIG. 1 is a block diagram of a printer 102 in an exemplary embodiment. FIG. 1 also illustrates a media 122 for imprinting by printer 102. Media 122 travels in the direction indicated by the arrow. Media 122 may be cut sheet media or continuous form media that is used by a high speed production printing system.

Printer 102 includes a print controller 104 and a print engine 118. Print controller 104 includes a rip spool 114 and a job spool 116. In printer 102, controller 104 receives print data 120 for imprinting onto media 122, and may spool print data 120 to job spool 116 until the job is ready for rasterization. Print controller 104 may also perform a number of data processing operations on print data 120, such as generating raster bitmaps of the logical pages of print data 120 and spooling the bitmap data to rip spool 114. Print controller 104 may then de-spool the bitmap data from rip spool 114 and provide it to print engine 118. Print engine 118 imprints media 122 based on the bitmap data.

When printing multiple copies of a print job, it is generally much faster to rasterize the print job (e.g., a print job received as print data 120) once to rip spool 114 and then de-spool the raster data for the print job multiple times to print engine 118 than it is to rasterize multiple copies of the print job. However, in some cases rip spool 114 may not have sufficient storage space to store a complete rasterized version of the print job. For example, the raster data for the print job may be too large to fit on rip spool 114. Also, other jobs may be stored as bitmap images on rip spool 114, thus rendering rip spool 114 unavailable (e.g., full) for storing bitmap data for a new job.

In prior printers, if a rip spool does not have enough storage space available for storing raster data for a print job intended to be printed multiple times, then the job may be aborted. The following example will clarify how this may occur. As jobs are received by the printer, the jobs are written to a job spool (e.g., job spool 116). Each of the jobs is subsequently de-spooled and buffered in a pipeline for rasterization. During a rasterization process for a multiple copy job, raster data for the job is written to a rip spool. If the rip spool becomes full or otherwise is unavailable to store a complete raster version of the job, aborting the job may be the only option as other jobs are already in the pipeline for rasterization subsequent to the current print job. Thus, multiple copies of the job cannot be printed, as only one copy of the print job is in the pipeline for rasterization. Also, the rip spool does not have the storage space available to store a complete rasterized version of the print job for de-spooling the rasterized version multiple times.

In this embodiment, print controller 104 does not abort a multiple copy job if rip spool 114 becomes full (e.g., storage space is exhausted) or is otherwise unavailable for storing a complete rasterized version of the print job. Instead, print controller 104 buffers for rasterizer 108 multiple copies of print data if a multiple copy job. If rip spool 114 does not have storage space available to store a complete rasterized version of the job, then rasterizer 108 has access to the multiple copies of the raw print data for the job in the buffer (such as buffer 112 of memory 110), and rasterizes the multiple copies of the job. The multiple rasterized copies are then provided to print engine 118. If rip spool 114 has storage space available to store the complete rasterized version of the print job, then the extra copies or partial copies (i.e., print data in excess of the original print job buffered for rasterization) are discarded. If rip spool 114 stores a complete rasterized version of the print job, then the raster data for the job is de-spooled multiple times and provided to print engine 118 to generate multiple copies of the job. This allows print controller 104 to recover and print a multiple copy job even though rip spool 114 may be temporarily full or otherwise unavailable to store a complete raster image of the print job. An example of how print controller 104 may operate will be discussed in more detail with regard to FIG. 2.

Figure 2:
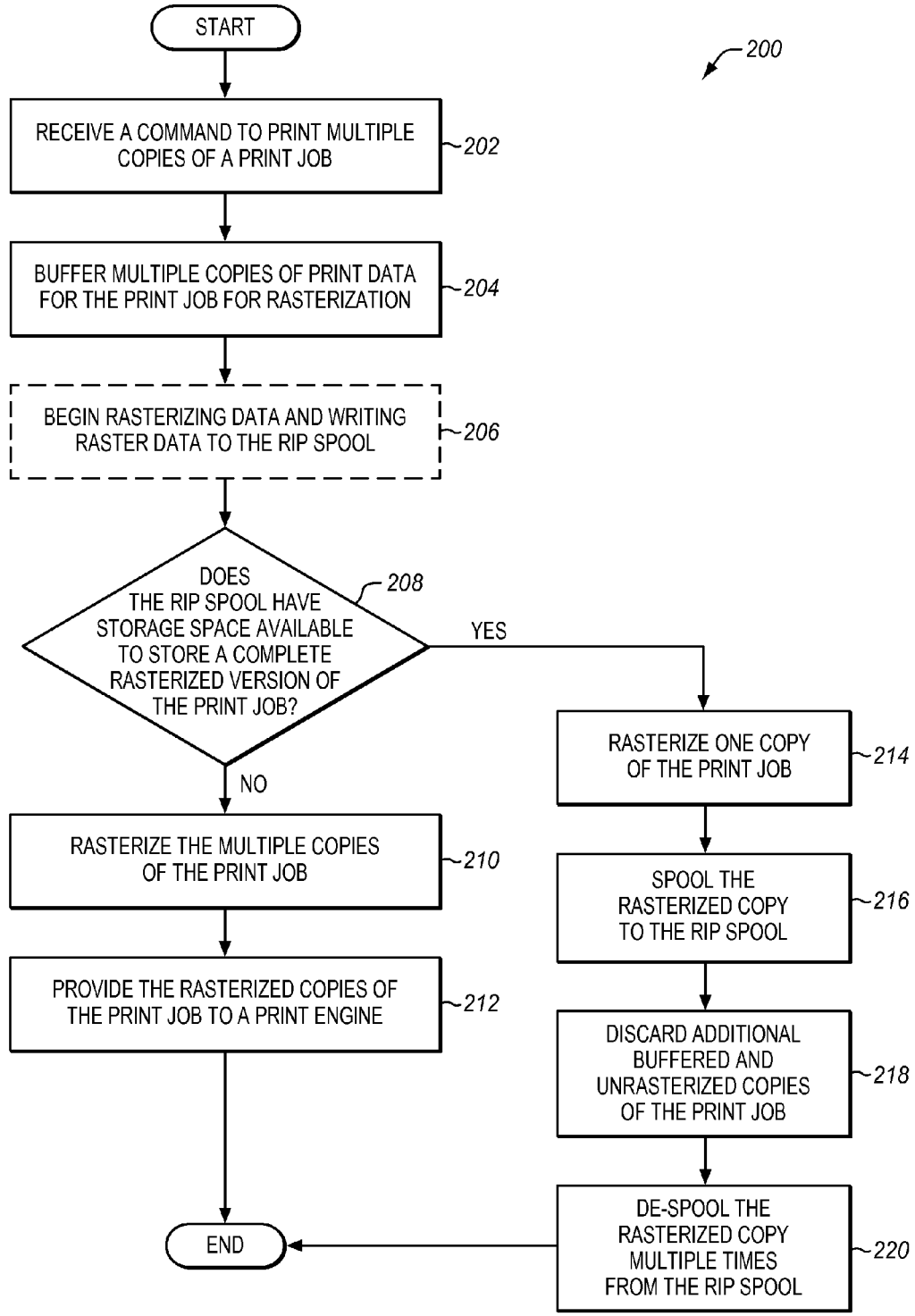
FIG. 2 is flow chart illustrating a method of recovering from an out of storage condition at a rip spool in an exemplary embodiment.

FIG. 2 is flow chart illustrating a method 200 of recovering from an out of storage condition at a rip spool in an exemplary embodiment. The steps of method 200 will be described with respect to printer 102 of FIG. 1, although one skilled in the art will understand that method 200 may be performed by other systems not shown. The steps of the methods described herein are not all inclusive and may include other steps not shown. The steps may also be performed in an alternative order.

Assume for this embodiment that control system 106 of print controller 104 (see FIG. 1) receives a command to print multiple copies of a print job (step 202 of FIG. 2). The command may be part of a job ticket for the print job. A job ticket defines metadata for a print job, such as the number of copies, the media size, the number of logical pages on a sheet side (i.e., n-up printing configuration), etc. The job ticket (along with the print job) may be stored on job spool 116.

Control system 106 buffers (i.e., pipelines) for rasterizer 108 multiple copies of print data for the print job (e.g., in buffer 112) in step 204. In buffering multiple copies of the job, control system 106 may de-spool the job multiple times off of job spool 116 and store the copies in buffer 112. Control system 106 may then begin rasterizing data in buffer 112 and write raster data to rip spool 114 (step 206). At some point (e.g., either before rasterizing the job or during a rasterization of the job), control system 106 determines if rip spool 114 has the storage space available to store a complete rasterized version of the print job (step 208). For instance, rasterizer 108 may be rasterizing data and writing the raster data to rip spool 114. During the rasterization process, rip spool may become full and therefore, unable to store a complete rasterized version of the print job. A complete rasterized version may include bitmap data for each logical page in the print job and/or bitmap data for sheet side images assembled from the logical page bitmaps. In n-up printing, sheet side images may be assembled from multiple logical page bitmaps. For example, in 4-up printing, four logical pages are printed on each sheet side. Therefore, the example sheet side image would include bitmap data for the four pages assembled into a raster image of the sheet side.

To determine if rip spool 114 is available to store a complete rasterized version of the job, control system 106 may perform a pre-flight process on the raw print data for the print job to estimate an expected size of the bitmap data for the job. In some cases, raster data for the print job may exceed the storage space that is available at rip spool 114. In other cases, the raster data for other print jobs may already be stored at rip spool 114, taking up storage space for storing a complete rasterized version of the new job. As determining if rip spool 114 has storage space available may be performed prior to and/or during the actual rasterization process for the job. Therefore, control system 106 may receive a notification from rasterizer 108 that rip spool 114 has become full and therefore, does not have the storage space available to store raster data for a complete rasterized version of the print job.

If rip spool 114 does not have storage space available to store a complete rasterized version of the job, then rasterizer 108 processes each of the multiple copies of the print data for the print job stored in buffer 112 to generate multiple raster copies of the print job (step 210). The multiple raster copies are provided to print engine 118 to complete the multiple copy request for the print job (step 212). Although rasterizing multiple copies of the print job is less efficient than de-spooling one rasterized copy multiple times, printer 102 does not have to abort the multiple copy job. This allows the job to be printed even though rip spool 114 is temporarily out of storage space or otherwise is unavailable. Incomplete rasterized versions of the job that are stored on rip spool 114 may then be deleted to make room on rip spool 114 for additional jobs.

In some cases, control system 106 may determine that rip spool 114 has storage space available to store a complete rasterized version of the print job in step 206. For instance, control system 106 may receive a notification from rasterizer 108 indicating that rasterization of the print job is complete, and that a complete rasterized version of the job is stored at rip spool 114. In this instance, print controller 104 rasterizes the job once (step 214) and spool the rasterized copy to the rip spool (step 216). Control system 106 may then discard extra copies of unrasterized print data for the job that are buffered for rasterization in step 218 (e.g., stored in buffer 112 for rasterizer 108). If a complete rasterized version of the job is stored at rip spool 114, then extra copies (or partial copies) of the print data for the job are no longer needed. Instead of rasterizing the job multiple times using the data in buffer 112, the raster version of the job may be de-spooled multiple times from rip spool 114 to print engine 118 (step 220). De-spooling one raster copy of the print job from rip spool 114 multiple times is faster than rasterizing the job multiple times.

In some embodiments, control system 106 may determine that an incomplete rasterized version of the print job is stored at rip spool 114, and that rip spool 114 does not have storage space available to store a complete rasterized version of the job. In other words, part of the complete raster image for the job may be stored at rip spool 114. In this embodiment, print controller 104 is operable to print multiple copies of the job by de-spooling the part of the raster image stored on rip spool 114 and rasterizing multiple copies of print data for the portion of the job that is not stored on rip spool 114. This allows print controller 104 to utilize part of the complete raster version for the print job stored in rip spool 114 to speed up the printing process.

In other embodiments, control system 106 may begin a process to buffer for rasterizer 108 multiple copies of print data for the job when a command is received to print a job multiple times. While a job is being de-spooled multiple times from job spool 116, control system 106 may determine at some point in the process that rip spool 114 has storage space available to store a complete rasterized version of the print job. For instance, rasterizer 108 performs a rasterization process on the first copy of the print job stored in buffer 112 and notifies control system 106 that a complete raster version of the print job is stored on rip spool 114. In this instance, multiple copies of print data for the job are no longer needed. Thus, control system may terminate the process to de-spool the job multiple times from job spool 116 and discard data stored in buffer 112 in excess of the original job data.

Example

Figure 3:
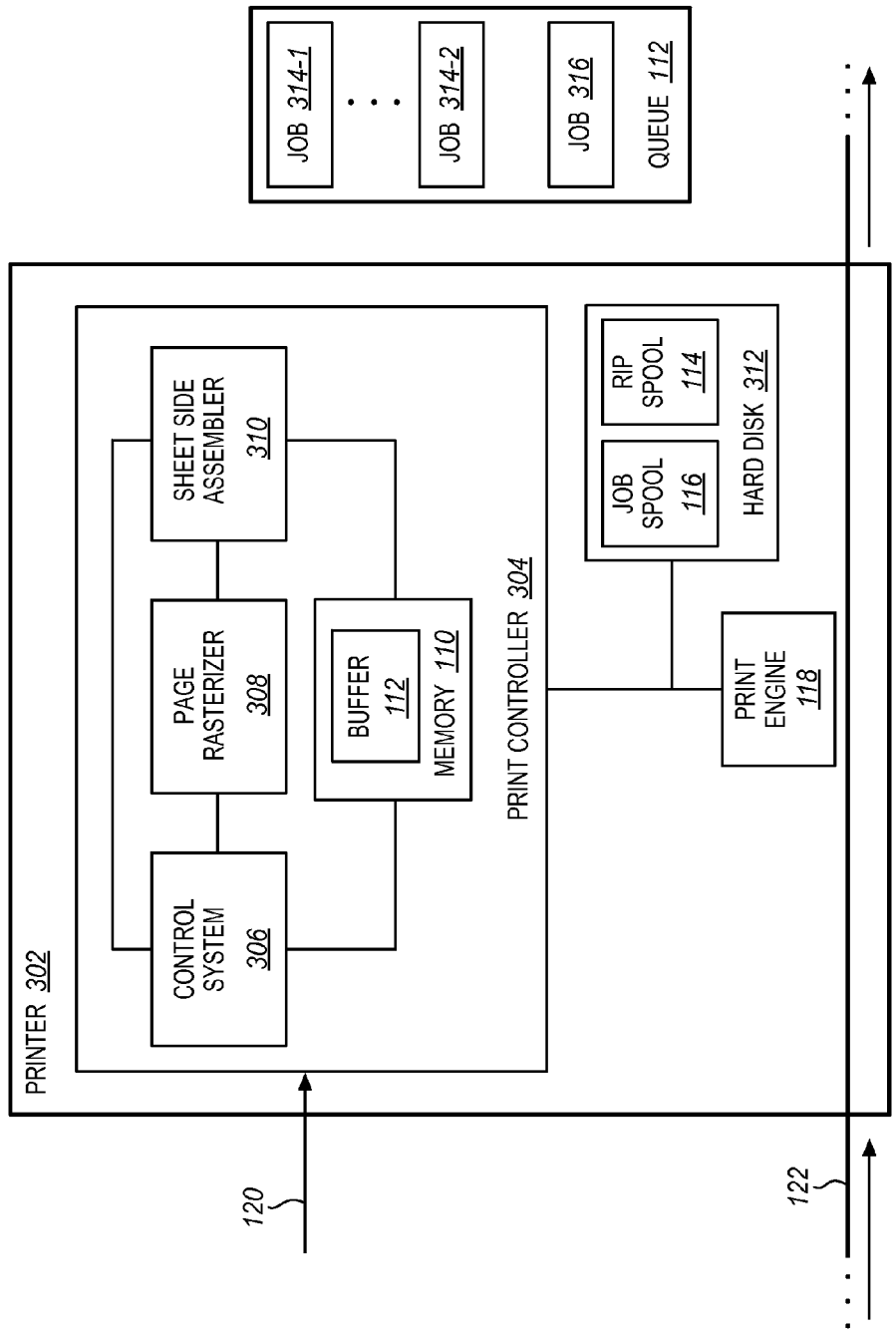
FIG. 3 is a block diagram of another printer in another exemplary embodiment.

FIG. 3 is a block diagram of another printer 302 in another exemplary embodiment. Similar to FIG. 1, printer 302 imprints media 122. Printer 302 includes a print controller 304, print engine 118, and a hard disk 312. Stored on hard disk 312 is a first partition storing rip spool 114 and a second partition storing job spool 116. In print controller 304, a page rasterizer 308 "rips" logical pages of a print job into bitmap images. Page rasterizer 308 will rip the pages to rip spool 114 if rip spool 114 is available. In n-up printing, a sheet side image may be assembled from multiple ripped pages. A sheet side assembler 310 builds sheet side images from the bitmap images of the logical pages. Sheet side assembler 310 may also attempt to store (i.e., spool) sheet side images to rip spool 114. In the example, consider that a number of jobs are spooled to job spool 116, such as job j, j+1, etc. In order to print job j, the job is de-spooled and buffered for rasterization. Typically, job j+1 is de-spooled and buffered subsequent to job j. However, control system 306 determines that job j is intended to print multiple times (i.e., job j is a multiple copy job). Thus, control system 306 buffers up multiple copies of job j in buffer 112. The multiple copies of job j are shown as jobs 314-1 and 314-2 in buffer 112. Job j+1 is shown as job 316. In the example, jobs are rasterized based on an order in buffer 112. Therefore, jobs 314-1 and 314-2 are rasterized before job 316. During a rasterization process, page rasterizer 308 writes rasterized logical pages of a print job to rip spool 114. When n-up printing for the job indicates multiple logical pages per side, sheet side assembler 310 may assemble sheet side images from the logical pages and write the sheet side images to rip spool 114. For example, page rasterizer 308 may provide bitmap images of the logical pages of a job to sheet side assembler 310 (either directly or using rip spool 114 as a buffer) for use by sheet side assembler 310 in assembling sheet side images. Regardless, in some cases rip spool 114 may become full or otherwise becomes unavailable to store a complete rasterized version of job 314. Typically, this causes job 314 to be aborted, as other jobs (e.g., job 316) are already pipelined or buffered for rasterization. In other words, it may be too late to go back and de-spool job 314 multiple times into buffer 112 for the rasterization process. To address this problem, control system 306 buffers multiple copies of print data for job 314 in case rip spool 114 becomes full or otherwise becomes unavailable. If rip spool 114 does not have storage space available to store a complete rasterized version of print data for job 314, then multiple copies of the job 314 remain in buffer 112 and therefore, are available for rasterization (e.g., copies 314-1 and 314-2 of the print job). If a complete rasterized version of job 314 is stored at rip spool 114, then it is not necessary to rasterize multiple copies of job 314. Instead, raster data for job 314 is de-spooled multiple times off of rip spool 114 and provided to print engine 118. In this case, the extra copies of job 314 that are buffered for rasterization (e.g., job 314-2) may be discarded. When discarded, the extra copies of job 314 are not rasterized. For example, page rasterizer 308 may analyze header data associated with job 314-2 and "consume" this data from buffer 112 without rasterizing the data. This frees up print controller 304 to perform other tasks, such as rasterizing job 316.

Figure 4:
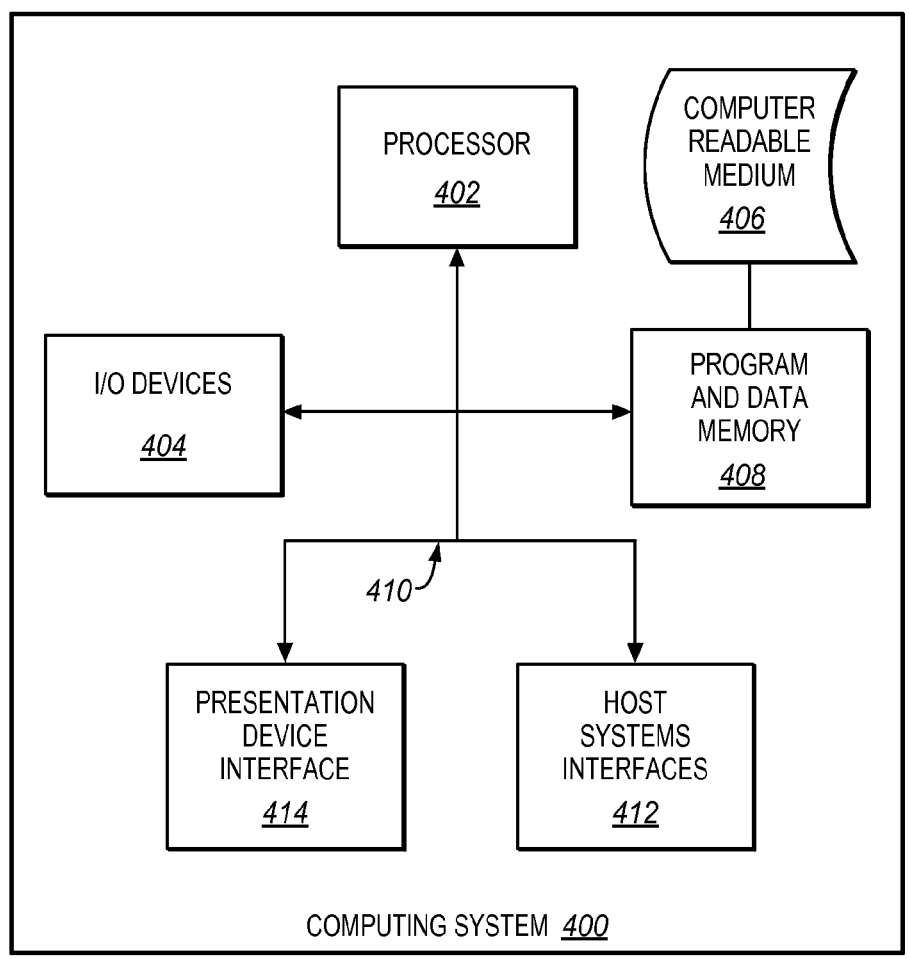
FIG. 4 illustrates a computing system in which a computer readable medium may provide instructions for performing the method of FIG. 2 in an exemplary embodiment.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 4 illustrates a computing system in which a computer readable medium may provide instructions for performing the method of FIG. 2 in an exemplary embodiment.

Furthermore, the invention can take the form of a computer program product accessible from a computer-usable or computer-readable medium 406 providing program code for use by or in connection with a computer or any instruction execution system. For the purposes of this description, a computer-usable or computer readable medium 406 can be any apparatus that can contain, store, communicate, or transport the program for use by or in connection with the instruction execution system, apparatus, or device.

The medium 406 can be an electronic, magnetic, optical, electromagnetic, infrared, or semiconductor system (or apparatus or device) or a propagation medium. Examples of a computer-readable medium 406 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include one or more processors 402 coupled directly or indirectly to memory 408 through a system bus 410. The memory 408 can include local memory employed during actual execution of the program code, bulk storage, and cache memories which provide temporary storage of at least some program code in order to reduce the number of times code is retrieved from bulk storage during execution.

Input/output or I/O devices 404 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 412, or remote printers or storage devices through intervening private or public networks. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

We claim:

1. A print controller comprising:
a control processor operable to receive a command to print multiple copies of a print job; and
a rasterizer operable to generate raster data for the print job, and to write the raster data to a rip spool;
the control processor is further operable to buffer for the rasterizer multiple copies of print data for the print job, and to determine if the rip spool has storage space available to store raster data for a complete rasterized version of the print job;
responsive to determining that the rip spool does not have storage space available to store the complete rasterized version of the print job:
the rasterizer is further operable to rasterize the multiple copies of print data for the print job, and to provide multiple rasterized copies of the print job to a print engine;
responsive to determining that the rip spool has storage space available to store the complete rasterized version of the print job:
the rasterizer is further operable to rasterize one copy of the print job, and to spool the one rasterized copy of the print job to the rip spool;
the control processor is further operable to discard copies of the print data for the print job that are buffered for the rasterizer, and to de-spool the rasterized copy of the print job multiple times from the rip spool to a print engine.

2. The print controller of claim 1 wherein:
the control processor is further operable to terminate a process to buffer the multiple copies of print data for the print job in response to determining that the rip spool has storage space available to store the complete rasterized version of the print job.

3. The print controller of claim 1 wherein:
the control processor is further operable to determine that an incomplete rasterized version of the print job is stored on the rip spool, and to discard the incomplete rasterized version.

4. The print controller of claim 1 wherein:
the control processor is further operable to determine that an incomplete rasterized version of the print job is stored on the rip spool, to de-spool the incomplete rasterized version multiple times to the print engine, to rasterize a portion of each of the multiple copies of the print data for the print job, and to provide the rasterized portion of each of the multiple copies of the print data to a print engine.

5. The print controller of claim 1 wherein:
the multiple copies of the print job buffered for the rasterizer are in a Page Description Language (PDL), and the rip spool stores bitmap images of logical pages of the print job.

6. The print controller of claim 1 wherein:
the control processor is further operable to de-spool the print job multiple times from a job spool to buffer for the rasterizer multiple copies of print data for the print job.

7. A method operable on a print controller of a printer, the method comprising steps of:
receiving a command to print multiple copies of a print job;
buffering for rasterization multiple copies of print data for the print job;
determining if a rip spool has storage space available to store raster data for a complete rasterized version of the print job;
responsive to determining that the rip spool does not have storage space available to store the complete rasterized version of the print job:
rasterizing multiple copies of print data for the print job; and
providing multiple rasterized copies of the print job to a print engine; and
responsive to determining that the rip spool has storage space available to store the complete rasterized version of the print job:
rasterizing one copy of the print job;
spooling the one rasterized copy of the print job to the rip spool;
discarding copies of the print data for the print job that are buffered for rasterization; and
de-spooling the rasterized copy of the print job multiple times from the rip spool to a print engine,
wherein the steps are executed by a processor.

8. The method of claim 7 further comprising the steps of:
terminating a process to buffer the multiple copies of print data for the print job in response to determining that the rip spool has storage space available to store the complete rasterized version of the print job.

9. The method of claim 7 further comprising the steps of:
determining that an incomplete rasterized version of the print job is stored on the rip spool; and
discarding the incomplete rasterized version.

10. The method of claim 7 further comprising the steps of:
determining that an incomplete rasterized version of the print job is stored on the rip spool;
de-spooling the incomplete rasterized version multiple times to a print engine;
rasterizing a portion of each of the multiple copies of the print data for the print job; and
providing the rasterized portion of each of the multiple copies of the print data to a print engine.

11. The method of claim 7 wherein:
the multiple copies of the print job queued for rasterization are in a Page Description Language (PDL), and the rip spool stores bitmap images of logical pages of the print job.

12. The method of claim 7 wherein buffering for rasterization further comprises:
de-spooling the print job multiple times from a job spool to buffer multiple copies of print data for the print job.

13. A non-transitory computer readable medium embodying programmed instructions which, when executed by a processor of a print controller, are operable for performing a method, the method comprising:

receiving a command to print multiple copies of a print job;

buffering for rasterization multiple copies of print data for the print job;

determining if a rip spool has storage space available to store raster data for a complete rasterized version of the print job;

responsive to determining that the rip spool does not have storage space available to store the complete rasterized version of the print job:

rasterizing multiple copies of print data for the print job; and providing multiple rasterized copies of the print job to a print engine; and responsive to determining that the rip spool has storage space available to store the complete rasterized version of the print job:

rasterizing one copy of the print job;

spooling the one rasterized copy of the print job to the rip spool;

discarding copies of the print data for the print job that are buffered for rasterization; and de-spooling the rasterized copy of the print job multiple times from the rip spool to a print engine.

14. The non-transitory medium of claim 13, wherein the method further comprises:

terminating a process to buffer the multiple copies of print data for the print job in response to determining that the rip spool has storage space available to store the complete rasterized version of the print job.

15. The non-transitory medium of claim 13, wherein the method further comprises:

determining that an incomplete rasterized version of the print job is stored on the rip spool; and discarding the incomplete rasterized version.

16. The non-transitory medium of claim 13, wherein the method further comprises:

determining that an incomplete rasterized version of the print job is stored on the rip spool;

de-spooling the incomplete rasterized version multiple times to a print engine;

rasterizing a portion of each of the multiple copies of the print data for the print job; and providing the rasterized portion of each of the multiple copies of the print data to a print engine.

17. The non-transitory medium of claim 13, wherein the multiple copies of the print job queued for rasterization are in a Page Description Language (PDL), and the rip spool stores bitmap images of logical pages of the print job.

18. The non-transitory medium of claim 13, wherein the method step of buffering further comprises:

de-spooling the print job multiple times from a job spool to buffer multiple copies of print data for the print job.

\* \* \* \* \*